United States Patent [19]
Herold

[11] Patent Number: 6,081,995
[45] Date of Patent: Jul. 4, 2000

[54] BELT FASTENER INSTALLATION APPARATUS

[75] Inventor: Wolfgang Herold, Engelsgasschen, Germany

[73] Assignee: Mato Maschinen-Und Metallwarenfabrik Curt Matthaei GmbH & Co. KG, Offenbach, Germany

[21] Appl. No.: 09/276,189

[22] Filed: Mar. 25, 1999

Related U.S. Application Data

[63] Continuation-in-part of application No. 08/254,292, Jun. 3, 1994, Pat. No. 5,553,359, which is a continuation of application No. 08/703,672, Aug. 27, 1996, Pat. No. 5,906,038.

[30] Foreign Application Priority Data

Aug. 27, 1995 [DE] Germany ............................. 19531433

[51] Int. Cl.⁷ .............................. B23P 19/00; B23P 11/00
[52] U.S. Cl. ........................................ 29/798; 29/243.51
[58] Field of Search ............................ 29/432.1, 243.51, 29/798, 524.1, 525.06, 243.53; 227/143, 147, 153, 155

[56] References Cited

U.S. PATENT DOCUMENTS 3,176,358   4/1965   Leflon .
4,258,461   3/1981   Pray .
4,688,711   8/1987   Gladding et al. .
4,815,587   3/1989   Musil .
5,487,217   1/1996   Richardson et al. .
5,524,808   6/1996   Vogrig .
5,531,012   7/1996   Schick .
5,553,359   9/1996   Herold .
5,774,972   7/1998   Ehrlich .

FOREIGN PATENT DOCUMENTS

0628747A1   12/1994   European Pat. Off. .
3219110A1   12/1982   Germany .
4343384A1   6/1995   Germany .

*Primary Examiner*—David P. Bryant
*Attorney, Agent, or Firm*—Price, Heneveld, Cooper, DeWitt & Litton

[57] ABSTRACT

The invention pertains to an installation for fastening a connecting element (1), specifically a U-shaped one, to the end (9) of a conveyor belt (10) with a peg-shaped fastening element (7). The fastening element is pushed through entry openings in the connecting element and through the conveyor belt, and is deformed at least in the area of its preceding end by a ram (36) that has a deforming contour, and is located in a tool (16). According to the invention, there follows also a secondary deformation of this area by a pressure bar (38), which is brought into contact with the tool containing the ram and the deformed end of the fastening element, after the contour of the fastening element had been already deformed.

24 Claims, 6 Drawing Sheets

BELT FASTENER INSTALLATION APPARATUS

CROSS-REFERENCE TO RELATED APPLICATIONS

The present application is a continuation-in-part of commonly assigned, U.S. patent application Ser. No. 08/254,292, filed Jun. 3, 1994, entitled FASTENER FOR CONVEYOR BELTS (now U.S. Pat. No. 5,553,359), and a continuation of Ser. No. 08/703,672, filed Aug. 27, 1996 (now U.S. Pat. No. 5,906,038).

BACKGROUND OF THE INVENTION

The invention pertains to an installation for fastening a connecting element, specifically a U-shaped one, to the end of a conveyor belt with a peg-shaped fastening element. The fastening element passes through entry openings in the leg end area of the connecting element and through the conveyor belt. A lower tool and an upper tool are provided for clamping the belt end, and are moveable towards each other as well as away from each other between the legs of the connection elements. A moveable ram is attached in the lower tool for pushing the fastening element through the entry openings in the connecting element and through the conveyor belt. A ram is connected with the upper tool, and the end of this ram which faces the fastening element contains a profile for deforming the fastening element after it has been pushed through the connecting element.

A similar mechanism is familiar from EP 628 747 A1. There, the peg-shaped fastening element is pushed with its blunt end first through the belt end. Then, the blunt preceding end and in some embodiments, its second blunt end, are belled out and/or anchored by pressure and deformation. For this purpose, the ends of the rams are pointed, so that they can form corresponding indentations in the faces of the fastening element.

Especially when the preceding end of the fastening element is manually belled out, a secure connection is established between fastening element and connecting element. The fastening element can be pushed through with relatively little force, so that there is no danger of the fastening element being crimped or deformed when it is pushed through the entry openings of the connecting element and through the conveyor belt. Then follows the extensive belling out or contouring of the preceding end independently from the first action with the required larger force for attaining the desired deformation of the fastening element in this target area. As a rule, the other end of the fastening element is already sufficiently deformed since it is the point from where the forces are directly initiated by the moveable ram in the lower tool.

An installation for fastening a U-shaped connecting element at the end of a conveyor belt with a peg-shaped fastening element is familiar from DE 32 19 110 A1. In DE 43 43 384 A1, an installation is described for fastening a connecting element to the end of a conveyor belt, where clamp-shaped fastening elements were used. Two cheek plates perform the deformation of the clamps, while the actual final deformation, which leads to and accomplishes the functional connection, is achieved by a plate.

It is the objective of the present invention to further develop an installation system for the above mentioned fastener type, as to ensure an especially secure connection of fastening medium and connecting element based on a larger fastening element deformation in the area of the insertion direction. The concept especially aims for a machine deformation, where the mechanism excels by its simple construction design.

SUMMARY OF THE INVENTION

The objective of an installation of the above mentioned type is attained by providing a pressure bar, which, after the profile of the fastening element is upset or belled out, can be brought in contact with the upper tool and with the deformed end of the fastening element. The invention provides for the final deformation or contouring of the preceding end of the connecting element, which is already belled out by the ram attached to the upper tool. This final deformation is accomplished by the pressure bar. The deforming profile of the ram could for instance consist of a cone or cup point, which affects a complimentary surface impression in the area of the preceding end of the fastening element. This point is smoothed by the pressure bar, which is clamped between the upper tool and the deformed end of the fastening element. To do so only requires that the upper and the lower tools be moved apart from one another after the initial deforming of the fastening element. The pressure bar is then brought into the gap between the upper tool and the belled out end of the fastening element, and the gap is closed by a relative movement of the upper and lower tools. The pressure bar's movement is preferred to be accomplished with a pneumatic cylinder.

The invention does not limit itself to installations having blunt ends on the fastening element. It is particularly conceivable for the preceding end of the connecting element to have, for instance, a conical indentation which is thus suited for perforating the conveyor belt like a cutter. The tail end of the fastening element can, for instance, be shaped like a rivet head, so that only the preceding end of the fastening element has to be deformed to attain a secure connection of fastening element and connection element.

It is totally sufficient for accomplishing the complete deformation of the preceding end if the pressure bar surface, which is brought in contact with the deformed end of the fastening element, is smooth. When the upper and the lower tools are brought together, then the smooth pressure bar deforms the initially belled out end of the fastening element and succeeds in pressing all material that extends into that area radially to the outside and thereby additionally against the connecting element.

An especially simple construction design is attainable, when the upper tool is stationary. Then, apart from the pressure bar, only the lower tool is moved. For that purpose, the lower tool is horizontally moveable to the upper tool, as well as the pressure bar is moveable vertically to the upper tool. This is a specially simple method of inserting the connecting element and the belt end of the conveyor belt into the installation from above. To attain secure positioning of the connecting element and the fastening element, the lower tool should serve as a receptacle for the connecting elements and the fastening elements. For that purpose, several connecting elements are connected to one another in a setting or holder rod and each fastening element is pre-inserted into the corresponding entry opening and aligned to the particular direction of insertion. The positioning of the belt end for fastening with the connecting element can be further optimized, if the lower tool has a stopper for locating the face area of the belt end.

Essential elements representing the new elements of the present invention concern the closure of the connecting element and the insertion of the fastening element through the opening in the connecting element and the conveyor belt.

So it is intended for the ram of the lower tool to be moveable relative to the lower tool via a sliding part, while a motor or force medium acts between the sliding part and the lower tool. Thus the ram which inserts the fastening element is not directly moved by a force medium which acts between the frame of the installation and the ram, but by one which acts between a separate sliding part and the ram. Another force medium acting between the frame and the sliding part is provided for moving the sliding part relative to the frame. The force medium which acts together with the lower tool, has the task of accomplishing the closing movement of the connecting element for clamping the belt end between both legs of the connecting element, before the ram, which is moveable in the lower tool, is activated through the sliding movement of the sliding part, brought about by the other force medium, and then pushes the peg-shaped fastening element through the connecting element and the conveyor belt. In essence, it would be sufficient if the force medium between the sliding part and the lower tool is a spring, which is strong enough to maintain a distance between the sliding part and the lower tool, when the legs of the connecting element are bent or crimped together, so that the moveable ram in the lower tool does not come in contact with the upper tool and this is not moved aside. Only when the other force medium increases the pressure on the sliding part, then the spring force is surpassed and the ram is moved. But a preferred embodiment of the force medium which acts with the lower tool as well as the force medium which acts together with the frame is hydraulic cylinders. The design of a hydraulic cylinder to act as the motor or force medium together with the lower tool has the advantage that this applied force, once it is built up, is constant, especially if a pressure limit is built into the control circuit of this hydraulic cylinder. In this context, an advantageous development provides that the instrument which acts as force medium together with the lower tool is a single acting hydraulic cylinder with a piston rod that supports itself on the lower tool, and that the force medium which acts together with the frame is a double acting hydraulic cylinder attached in the frame with a piston rod which is connected to the sliding part. The force medium that acts together with the frame has a pressure chamber on the cylinder side with a relatively large piston area, and with a pressure pipe connection to the pressure chamber on the cylinder side area of the force medium acting together with the lower tool with a relatively small piston area. Thus, a part of the reverse motion activated by the hydraulic cylinder, which generates a large force as it acts with the frame, forms the propulsion of the hydraulic cylinder which acts with the lower tool and generates a significantly smaller force.

In an advantageous manner, to enable the upper and the lower tools to be pushed apart into their original positions, a spring is provided between them. Furthermore, the piston rod of the force medium acting together with the lower tool should support itself against the force of a spring on the lower tool, so that the force for retracting this piston rod does not have to be generated alone by the spring between the upper and lower frame.

Corresponding to the pressure bar, as specified by the invention, there can, of course, also be provided a second moveable pressure bar, which smoothes the posterior end, relative to the insertion direction, of the fastening element after its contour has been deformed. In this case, but also generally, the moveable ram attached in the lower tool can be provided with a profile for deforming the fastening element in its area facing the fastening element.

A special model of the invention provides for a clamping device to press the belt end in the lower tool. In effect, the clamping device is intended to press the belt end to the lower tool during the whole procedure of fastening the connecting elements to the end of the conveyor belt. Thus, the clamping device follows the back and forth or reciprocating motion of the lower tool during the operating procedure of the installation. Fastening the belt end, and thus also the connection elements to the lower frame, ensures fast work with high piece rates. Preferably, the clamping device is located in the stationary frame, and it has a stopper which is moveable relative to that frame. Basically, there exists also the option of locating the clamping device on the stationary tool, but exchangeable upper frame. According to a special model, the clamping device contains a pneumatic cylinder. Without requiring a regulating unit, the extended pressurized stopper is automatically retracted along the sliding direction of the lower tool during a movement of the lower tool in the direction of the upper tool, because of the force medium acting upon the lower tool, and thus it pushes the air pressure in the pneumatic cylinder back into the compressed air network. On the other hand, during a movement of the lower tool away from the upper tool, the stopper is automatically driven out. Instead of a pneumatic cylinder, it is certainly possible also to use a hydraulic cylinder, where a regulating unit controls and/or regulates the hydraulic cylinder in the previously described concept. The stopper is purposely connected to the piston rod of the pneumatic or the hydraulic cylinder; furthermore, the lower tool has a stop plate which clamps the belt end between itself and the stopper.

Thus the invention proposes a device for fastening a connecting element, especially a U-shaped one, to the end of a conveyor belt, which works as follows:

Arrangement of the belt ends between the spread apart legs of the connecting element, Bending the legs of the connecting elements together for positioning the legs on the belt end, Pushing the fastening elements through aligned entry openings in the legs of the connecting element and through the belt end, Deforming the front end of the fastening element which was pushed through the connecting element, Smoothing the deformed fastening element, while, according to a preferred design of the invention, the belt end is pressed against the moveable lower tool during the fastening process, specifically with a clamping device, which clamps the belt end between itself and the lower tool.

Further characteristics of the invention are represented in the description of the figures, as well as by the figures themselves, where it is noteworthy that all individual characteristics and all combinations of those characteristics are the essentials of the invention.

The figures represent the invention in simplified form through an example model, without being limited to it. The following is shown in:

DETAILED DESCRIPTION OF THE PREFERRED EMBODIMENTS

Figure 1:
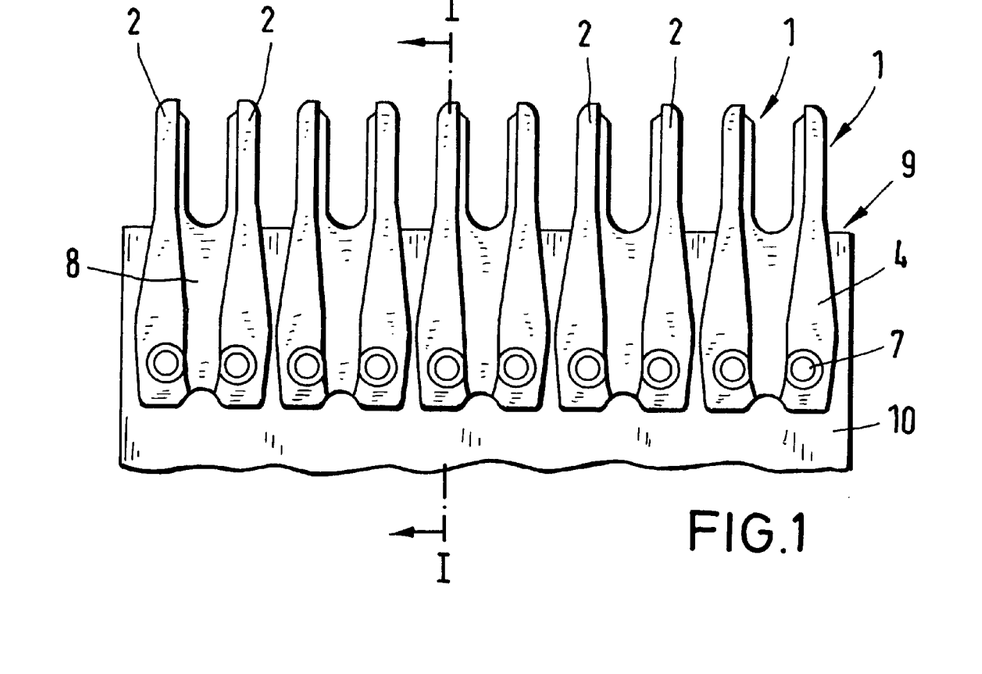
FIG. 1 A top view of a conveyor belt with several connection elements attached to the belt end, FIG. 2 a sectional view taken along line I—I in FIG. 1, FIG. 3 a schematic drawing of the installation which serves to form the belt connection, according to the invention, illustrated in its original position, FIGS. 4 to 7 the subsequent operational positions of the installation shown in FIG. 3.
Figure 2:
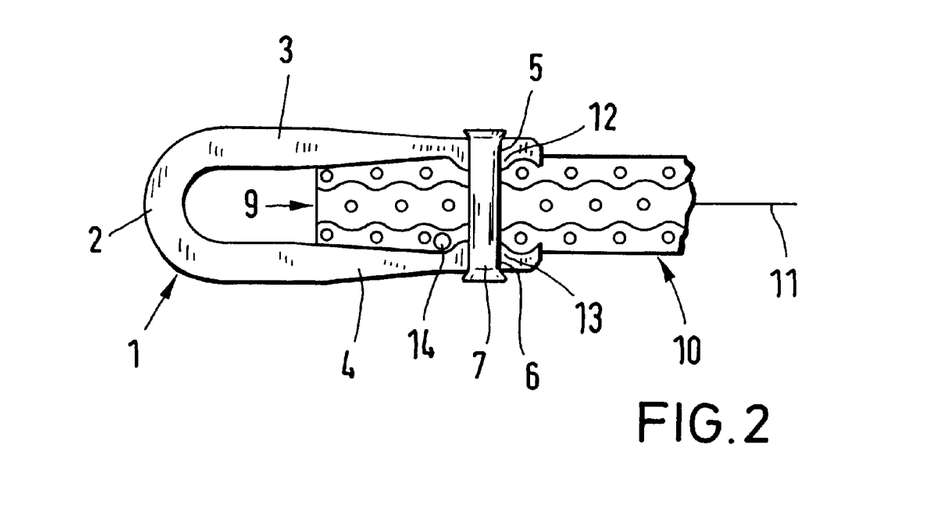

The installation shown closer in FIGS. 3 to 7 serves to fasten at least one connecting element 1, but preferably multiple connecting elements to the end 9 of a conveyor belt 10. The connecting elements 1 attached to the end 9 of the conveyor belt 10 are shown in FIG. 1 and 2. Each particular connecting element 1 is U-shaped and contains a somewhat semi-circular coupling eye 2 and two fastening legs 3 and 4 with entry openings 5 and 6 in their end areas for inserting a peg-shaped fastening pin or element 7. Two connecting elements 1 each form a modular unit by being linked at those halves of the fastening legs 3 and 4 facing the entry openings 5 and 6 by a connecting bridge 8 which is indented towards the outer surface of the fastening legs 3 and 4. In the area of the connecting bridges 8, each particular connecting element 1 surrounds the belt end 9 of the conveyor belt 10. The middle area of the belt end 9 is identified by the reference number 11. On the side facing the conveyor belt 10 around their entry apertures or openings 5 and 6, the fastening legs 3 and 4 are provided with conical annular rings 12 or 13, which press into the conveyor belt 10. Before attaching the fastening element 7, the U-shaped connecting element 1 is spread apart and the peg-shaped fastening element 7 only passes through the opening 6 in the fastening leg 4. The fastening element 7 has a constant diameter along its whole length and is flattened out or blunt in its two end face areas. The fastening element 7, shown in FIG. 2, does not have the upset or deformed, expanded face surface profile, until after it is inserted through the entry openings 5 and 6 of the fastening legs 3 and 4 and through the conveyor belt 10. Rams 33 and 36 that will be closer described later on, deform the peg-shaped fastening element 7 on both ends, while the end extending in the direction of the insertion and thus the end assigned to the entry opening 5 is additionally contoured or smoothed.

For exact positioning of the many connecting elements 1 which connect to the conveyor belt 10, connecting elements 1 are welded together with a rod 14 (FIG. 2) which runs perpendicular to the direction of the conveyor belt 10.

Figure 3:
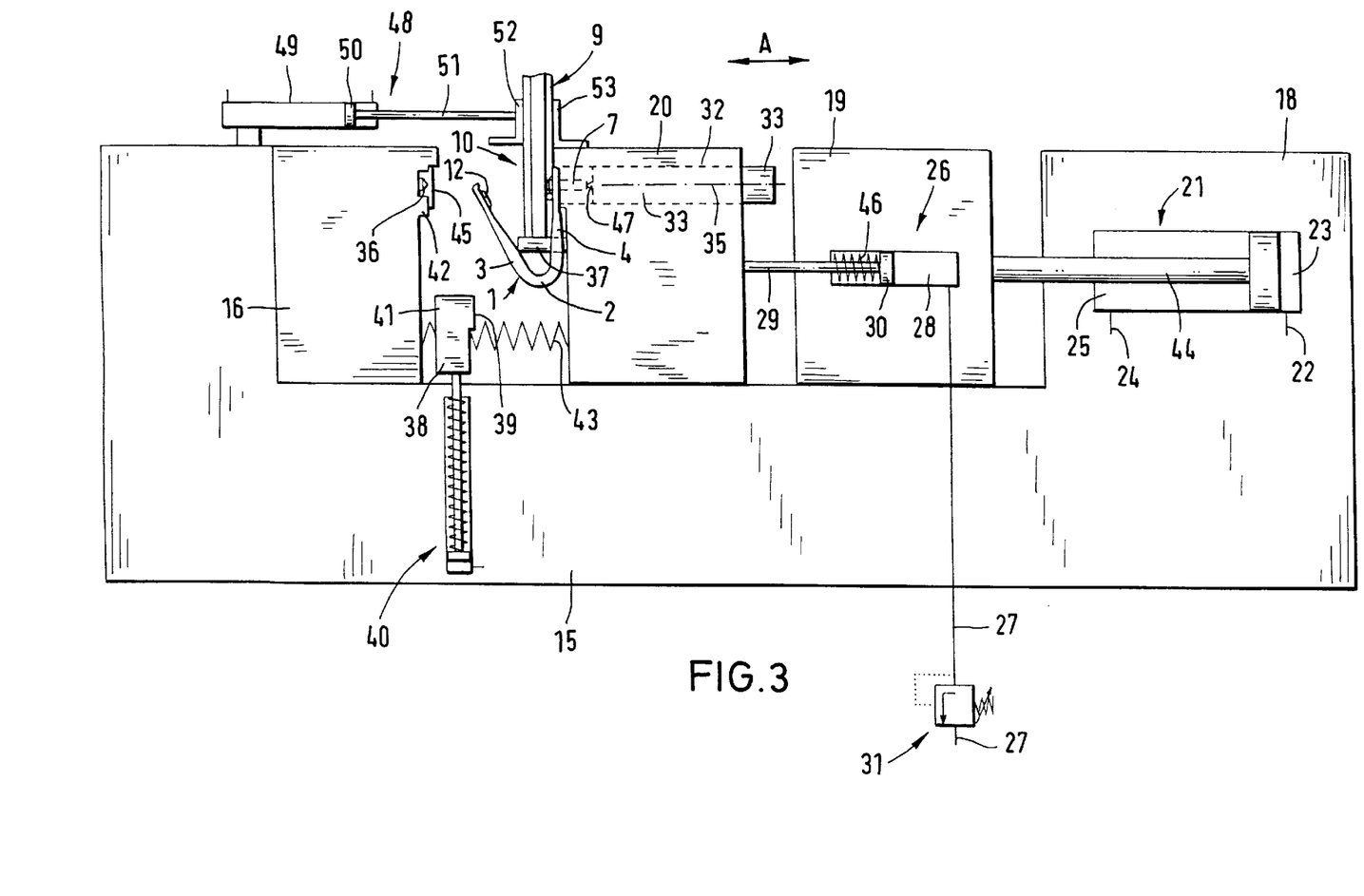

FIG. 3 represents the installation for forming the connection shown in FIGS. 1 and 2 as well as its method of operation.

Within the frame 15 of the installation with a cross-section that is essentially U-shaped, there is attached a stationary upper tool 16. It supports itself on a leg 17 of the frame 15. Movably attached in the area of the opposite leg 18 of the frame 15 there is a sliding part 19. Attached between the sliding part 19 and the upper tool 16 there is, furthermore, a lower tool 20, which is also located movably within the frame 15. The direction of the motion of the sliding part 19 and of the lower tool 20 is indicated by the double arrow "A".

Attached within the leg 18 of the frame 15 there is a double acting hydraulic cylinder 21 with a supply line 22 to the pressure chamber 23 on the cylinder side, and a supply line 24 to the pressure chamber 25 on the piston rod side. The free end of the piston rod 44 of the hydraulic cylinder 21 is linked to the sliding part 19. Located on the sliding part 19, there is a single acting hydraulic cylinder 26 with a supply line 27 leading to its pressure chamber 28 on the cylinder side. The piston rod 29 of the hydraulic cylinder 26 rests with its free end on the side of the lower tool 20 facing away from the upper tool 16. A spring 46 acts counter to the retraction direction of the piston rod 29 on the piston of the hydraulic cylinder 26. The pressure pipe 27 of the hydraulic cylinder 26 is supplied by the supply line 22 of the hydraulic cylinder 21 during the reverse movement of the same, while a portion of the hydraulic oil is fed from the hydraulic cylinder 21 to the supply line 27 and drives out the piston rod 29 of the hydraulic cylinder 26.

Affixed to the supply line 27 is a pressure control valve 31, which limits the maximum pressure in the hydraulic cylinder 26 to about a half or a third of the maximum pressure in the hydraulic cylinder 21, where the hydraulic cylinder 21 displays a significantly larger piston surface than the hydraulic cylinder 26. When the pressure in the supply line 27 reaches or surpasses the pressure set by the pressure control valve 31, the piston rod 29 of the hydraulic cylinder 26 is pushed inside under constant pressure.

The lower tool 20 contains a multitude of bores 32, which, relative to the plane of projection according to FIGS. 3 to 7, are aligned behind one another and each of them serves as a receptacle for a ram 33, which can be slid into them. In the original position shown in FIG. 3, the specific ram 33 juts into the gap 24 formed between the lower tool 20 and the sliding part 19. Aligned with the longitudinal central axis 35 of each ram 33, the upper tool 16 has a cone-shaped ram 36 affixed tightly to the upper tool 16. The moveable ram 33 contains a cone-shaped, raised end 47 in alignment with the ram 36, that means in the area of its longitudinal central axis 35. The piston rods 29 and 44 of the hydraulic cylinders 26 and 21, as well as the ram 33 can be slid in the direction of the double arrow "A".

For positioning the many connecting elements 1 shown in FIGS. 1 and 2 on the belt end 9, the lower tool 20 contains several locating points 37, which are aligned relative to the plane of projection, on the side facing the upper tool 16, on which the fastening elements 1, with their coupling eyes 2 facing down, can be positioned for contact with their connecting bridges 8. The belt end 9 also is inserted with its face edge against the locating points 37 between the spread apart holding legs 3 and 4 of each connecting element 1.

Between the upper tool 16 and the lower tool 20, a pressure bar 38 is located, which extends across the area where the connecting elements 1 are affixed to the conveyor belt 10. The pressure bar 38 contains on the side facing the lower tool 20, an even or flat, vertically oriented pressure bar surface 39. The pressure bar 38 can be moved vertically by a pneumatic cylinder 40. While in the completely raised position of the pressure bar 38, the central area of the pressure bar surface 39 is located at the height of the longitudinal central axis 35 of the ram 33. The level or flat back side 41 of the pressure bar 38 is also vertically oriented, faces the upper tool 16, is aligned with the contour of the upper tool 16, and conforms to the protrusions 42 on the upper tool. Protrusions 42 extend past the ram 36 and act exclusively with the indented connecting bridges 8 between each pair of connecting elements 1. When the connecting elements 1 are bent together, flexed locating points 45 on the upper tool 16 contact the indented connecting bridge 8 between the connecting elements and so permit each connecting element 1 to slide off when the upper tool 16 is bent together. Relative to the plane of projection between the upper tool 16 and the lower tool 20, several springs 43 are aligned behind one another.

With the illustrated frame 15, there is also a clamping device 48 for pressing the belt end 9 against the lower tool 20. The clamping device 48 contains a pneumatic cylinder 49, which is located within the frame 15, and a piston 50 which is double acting. The piston rod 51, which is moveable in the direction of the double arrow "A" is linked to the piston 50, and carries in the area of its free end a stopper 52 with a clamping area which is arranged parallel to the facing surface of the belt end 9 or the plane of belt middle area 11. A corresponding stop plate 53 is connected to the lower tool 20, while the clamping surface of this plate 53 is aligned with the positioning surface of the belt end 9 on the lower tool 20.

The following is a description of the operating method of the installation according to the illustrated model.

Figure 4:
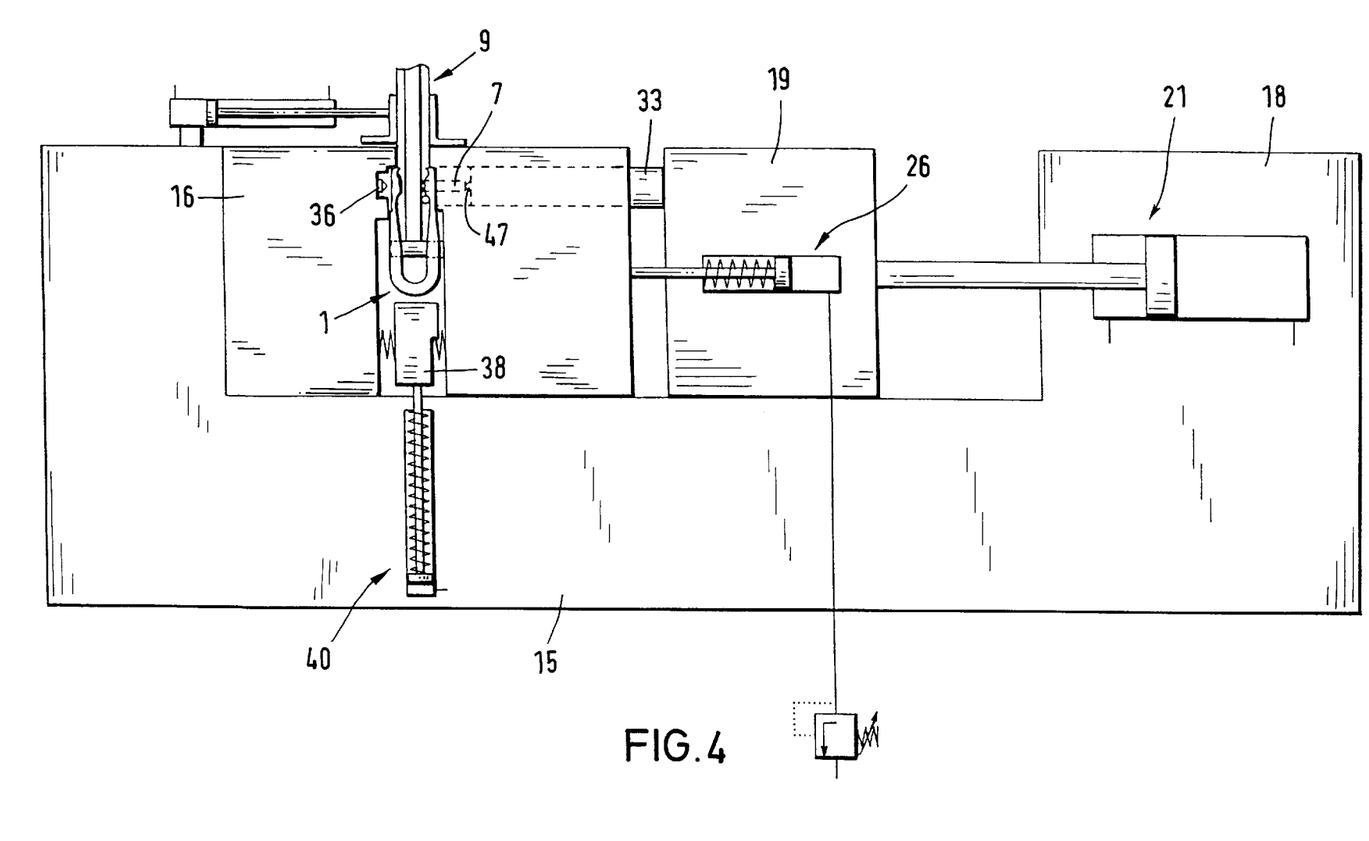
Figure 5:
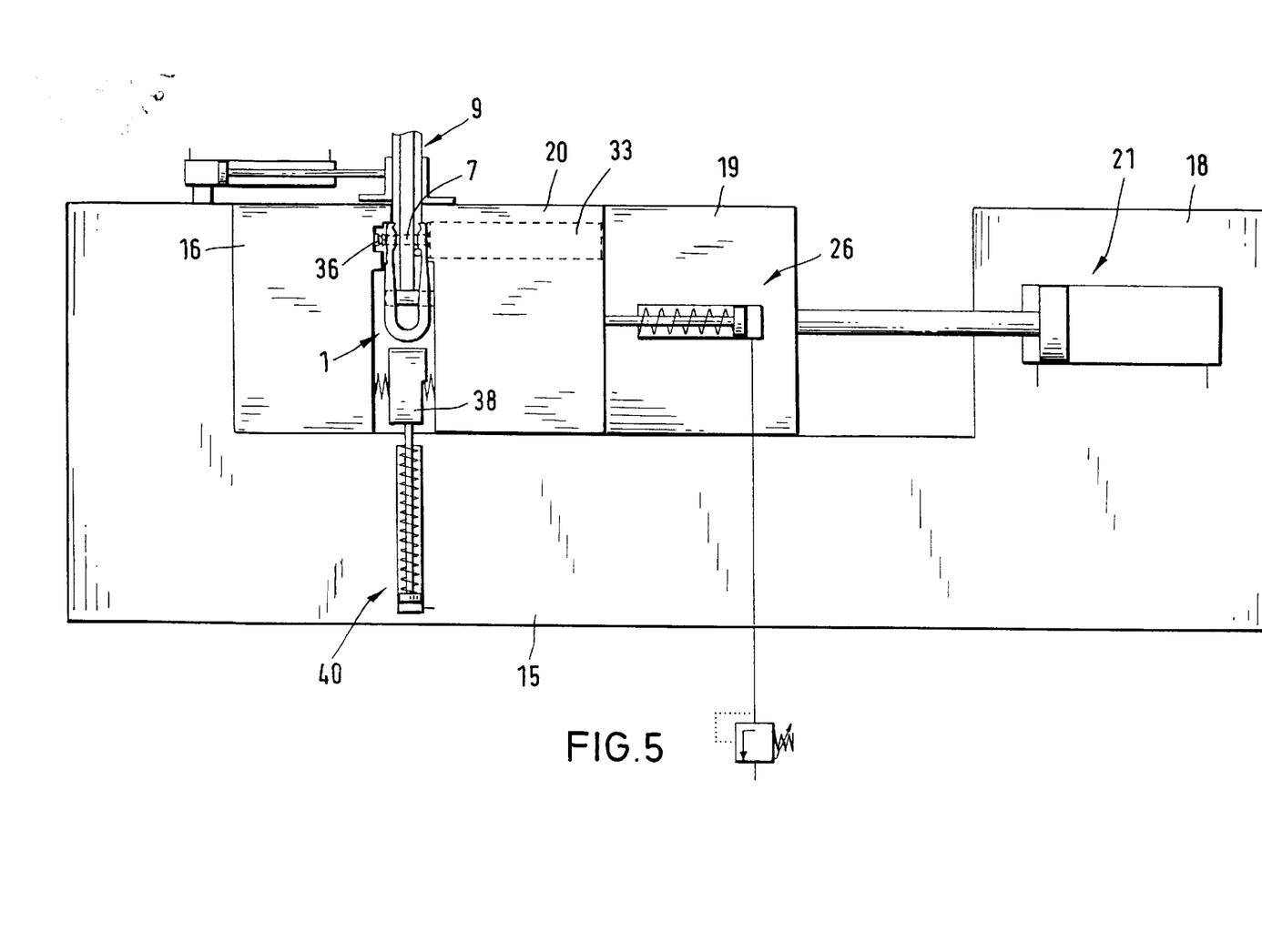
Figure 6:
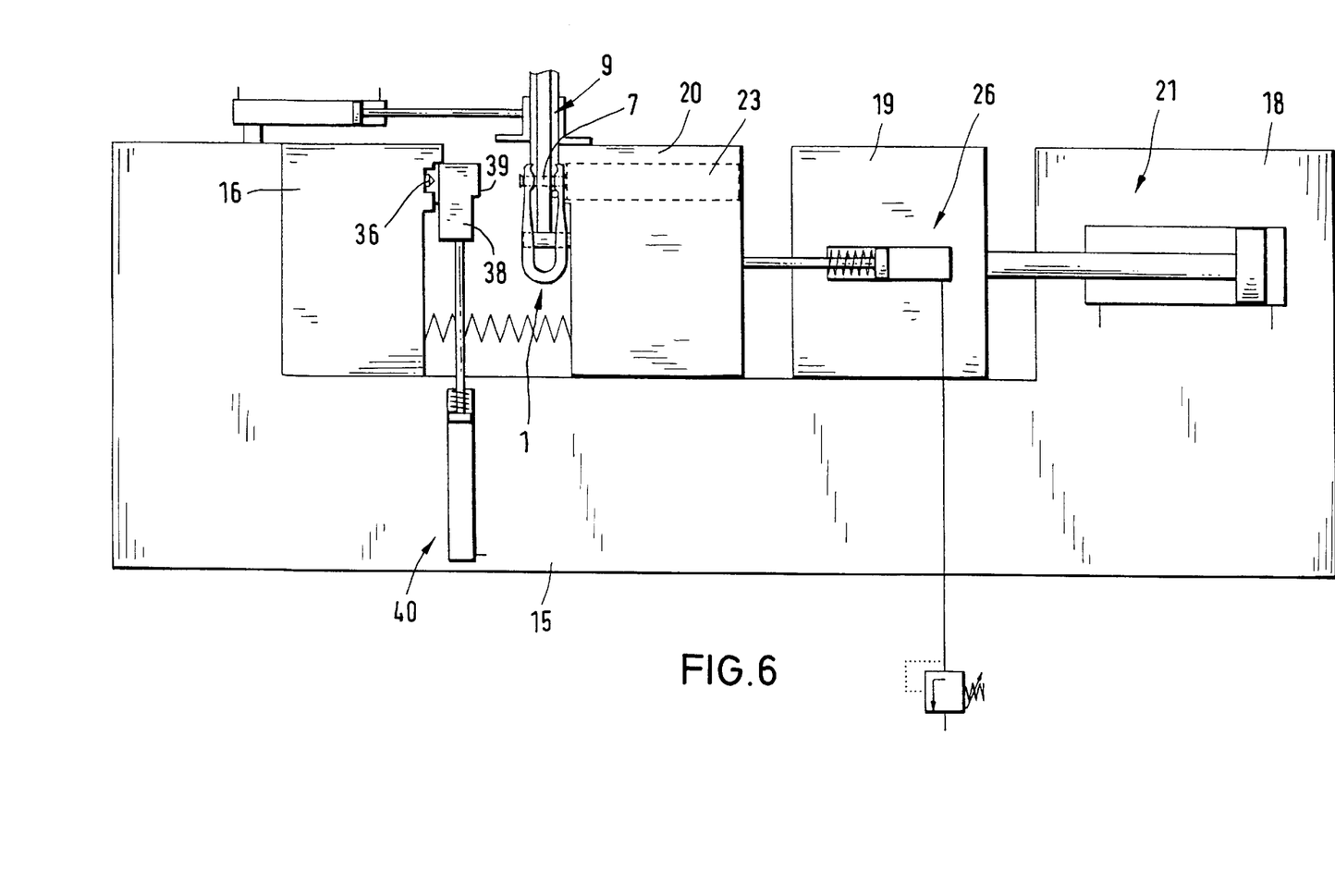
Figure 7:
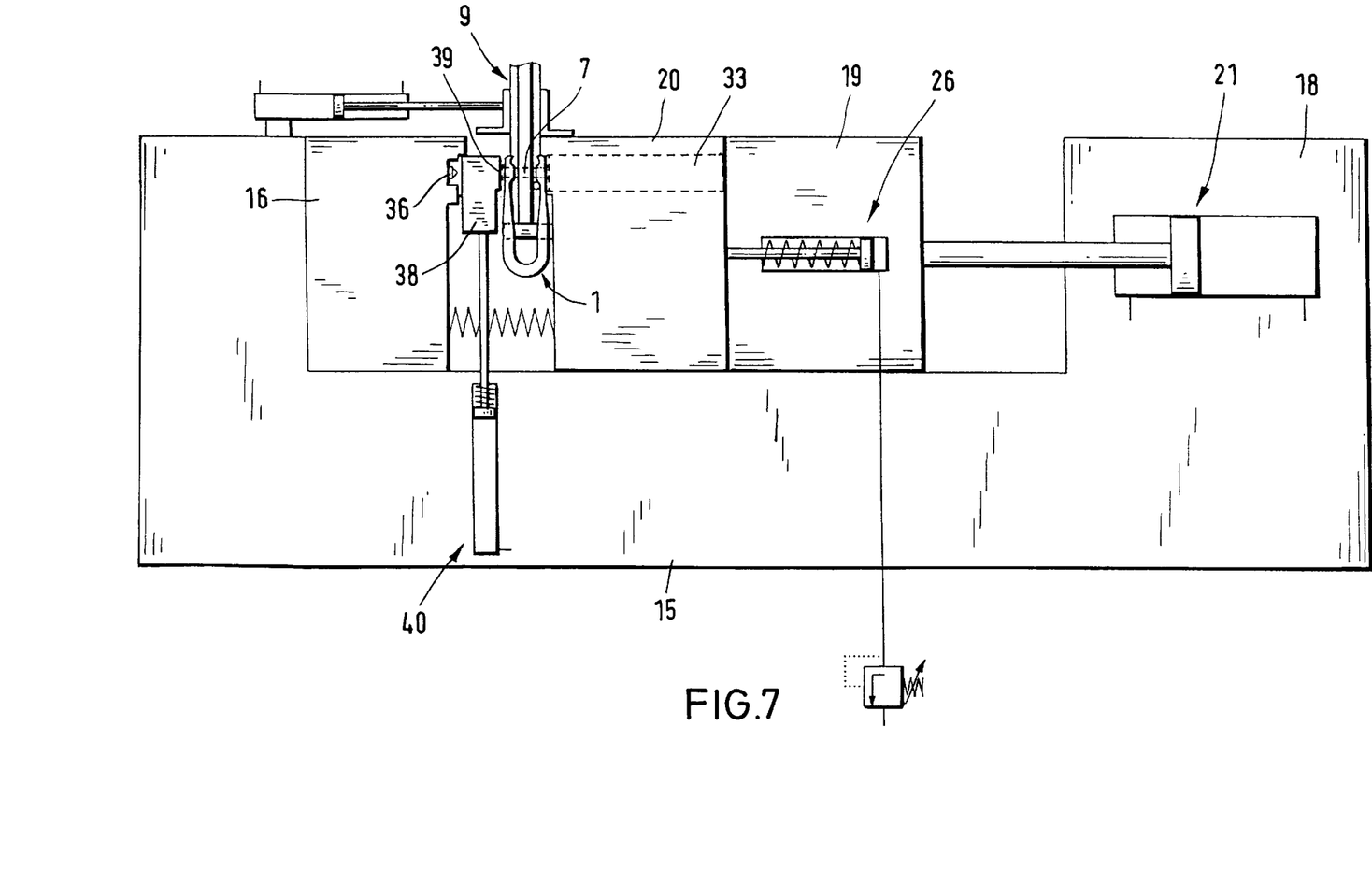

In the original position according to FIG. 3, the clamping plate 52 of the clamping device 48 is extended and pushes the belt end 9 against the clamping plate 53 of the lower tool side. Furthermore, the upper tool 16 and the lower tool 20 are moved apart, and the hydraulic cylinder 26 is pressurized. The pressure bar 38 is retracted. Set on top of the locating points 37, there are connecting elements 1, which are fixed to one another by rod 14 and which have a fastening peg 7 preset in the area of each fastening leg 4. The belt end 9 is pushed vertically against locating points 37 and passes through the leg area of the connecting elements 1 which are spread apart. At this time, the hydraulic system of the hydraulic cylinder 21 is activated, which causes the piston rod 44 of the hydraulic cylinder 21 to extend and move the sliding part 19. The force transferred from the hydraulic cylinder 26 by the piston rod 29 to the lower tool 20 remains static. This is because the liquid locked in the pressure chamber 28 of the hydraulic cylinder 26 cannot flow off through the line 27 until the pressure is achieved or surpassed which is set in the pressure control valve 31. Thus the sliding part 19 pushes the partially extended piston rod 29 of hydraulic cylinder 26 and the lower tool 20 toward upper tool 16 against the force of the springs 43 between the upper and the lower tools 16, 20. The now open connecting elements 1, glide along bending projections 45 and are then bent over or crimped onto belt end 9 as is illustrated in FIG. 4. As the hydraulic cylinder 21 is further activated, it moves the ram 33 directly abutting the sliding part 19, so as to push the peg-shaped fastening elements 7 associated with connecting elements 1 through the corresponding entry openings 5 and 6 of each connecting element 1 and through the conveyor belt 10. The surface areas of the rams 33 and 36 act upon the opposite ends of the peg-shaped fastening elements 7 and deform them. This deformed condition is shown in FIG. 5. Thereafter, the hydraulic cylinder 21 is operated in the opposite direction, so the hydraulic cylinder 21 retracts the sliding part 19 and reactivates the pressure chamber 28 of the hydraulic cylinder 26 via the line 22 of the hydraulic cylinder 21. The springs 43 ensure that the lower tool 20 remains pressed against the piston rod 29 of the hydraulic cylinder 26. The ram 33 remains in its extended position. Then the pressure bar 38 is extended as shown in FIG. 6. Subsequently, hydraulic cylinder 21 is again activated, so that the stronger hydraulic cylinder 21 moves the sliding part 19 next to the lower tool 20 against the force of the weaker hydraulic cylinder 26 and thus presses again upon the connecting elements 1 linked to the conveyor belt 10. This occurs, because the back side 41 of the pressure bar 38 supports itself on the protrusions 42 of the upper tool 16, and the pressure bar 38 with its pressure bar surface 39 again deforms in a sort of smoothing operation the deformed preceding end of each fastening element 7. This condition is shown in FIG. 7. Afterward, the hydraulic cylinder 21 is again deactivated without pressure, and the installation returns to its original position as shown in FIG. 3, where the belt end 9 with the connecting elements 1 attached can be removed.

The pneumatic control of the clamping device 48 is designed, so that during the previously mentioned driving of the lower tool 20 in the direction of the upper tool 16, the larger force of the lower tool 20 leads to a corresponding retraction of the piston rod 51 of the pneumatic cylinder 49, and when the lower tool 20 moves away from the upper tool 16, the pressure activation of the pneumatic cylinder 49 causes a synchronized extension of the piston rod 51, so that the belt end 9 is securely retained between the stopper 52 and the stop plate 53.

Only when the connecting elements 1 are attached to the belt end 9 and the smoothing operation has been performed by the pressure bar 38, is the piston rod 51 of the clamping device 48 retracted, so that the belt end 9 with its attached connecting elements 1 can be removed from the installation.

What is claimed is:

1. A machine for fastening a connecting element to the end of a conveyor belt with a fastening element having a leading forward end, comprising:

a first tool and a second tool which shift between open and closed positions for clamping opposite legs of the connecting element onto the belt end;

a moveable drive ram operably connected with said second tool, and pushing the forward end of the fastening element through associated entry openings in the connecting element and through the conveyor belt;

an upsetting ram operably connected with said first tool, positioned to face the forward end of the fastening element, and having a profile which upsets the forward end of the fastening element after the same is pushed through the connecting element so as to form a secure connection therebetween; and a pressure bar which selectively shifts into contact with said first tool after the forward end of the fastening element has been upset, and having a profile which shapes the upset forward end of the fastening element.

2. A machine as set forth in claim 1, wherein:

said pressure bar profile defines a smooth surface for rounding the upset end of the fastening element.

3. A machine as set forth in claim 2, wherein:

said first tool is stationary.

4. A machine as set forth in claim 3, wherein:

said second tool moves horizontally to said first tool; and said pressure bar moves vertically to said first tool.

5. A machine as set forth in claim 4, wherein:

said second tool includes a receptacle for retaining the connecting elements with fastening elements mounted therein.

6. A machine as set forth in claim 5, wherein:

said second tool includes a stopper for positively positioning the face of the belt end between said first and second tools.

7. A machine as set forth in claim 6, wherein:

said first ram is moved by a sliding part which moves relative to said second tool; and a first motor is operatively positioned between said sliding part and said second tool.

8. A machine as set forth in claim 7, including:

a second motor operatively positioned between said sliding part and said frame for moving said sliding part.

9. A machine as set forth in claim 8, wherein:

said first motor and said second motor comprise hydraulic cylinders.

10. A machine as set forth in claim 9, wherein:

said first motor comprises a single acting hydraulic cylinder with a piston rod supported on said second tool; and said second motor comprises a double acting hydraulic cylinder supported on said frame, and has a piston rod linked to said sliding part and a pressure chamber with a large piston surface communicating with a pressure chamber on the cylinder side of said first motor, which has a relatively small piston surface.

11. A machine as set forth in claim 10, including:
a pressure control valve communicating with the piston side of said first motor.

12. A machine as set forth in claim 9, including:
a spring operably positioned between said first tool and said second tool and biasing the same apart.

13. A machine as set forth in claim 12, wherein:
said piston rod of said first motor supports itself against the force of said spring.

14. A machine as set forth in claim 13, including:
a pneumatic cylinder operatively connected with said pressure bar, and reciprocating the same.

15. A machine as set forth in claim 14, wherein:
said ram on said lower tool has a point on the end towards the fastening element for deforming the end of the fastening element that faces it.

16. A machine as set forth in claim 15, including:
a clamping device for pressing the belt end to the said lower tool.

17. A machine as set forth in claim 16, wherein:
said clamping device includes a stopper.

18. A machine as set forth in claim 17, wherein:
said clamping device includes a pneumatic cylinder with a piston rod that incorporates said stopper.

19. A machine as set forth in claim 18, wherein:
said second tool includes a stop plate which clamps the belt end between itself and said clamping device.

20. A machine for fastening a connecting element to the end of a conveyor belt with a peg-shaped fastening element having at least one blunt end, comprising:
a first tool and a second tool which shift between open and closed positions for clamping opposite legs of the connecting element onto the belt end;
a moveable first ram operably connected with said second tool, and pushing the blunt end of the fastening element through associated entry openings in the connecting element and through the conveyor belt;
a second ram operably connected with said first tool, such that an end of this said second ram faces one end of the fastening element, and contains a profile which deforms the blunt end of the fastening element after the same is pushed through the connecting element; and wherein:
the other end of the fastening element is also blunt; and
said first ram contains a profile which deforms the other blunt end of the fastening element.

21. A machine as set forth in claim 20, wherein:
said first and second rams are operatively aligned and actuated to contemporaneously deform both ends of the fastening pin.

22. A machine as set forth in claim 21, including:
a pressure bar which selectively shifts into contact with said first tool and the deformed end of the fastening element after the contour of the fastening element has been deformed.

23. A machine for fastening a connecting element to the end of a conveyor belt with a solid peg-shaped fastening element having at least one blunt end, comprising:
a first tool and a second tool which shift between open and closed positions for clamping opposite legs of the connecting element onto the belt end;
a moveable first ram operably connected with said second tool, and pushing the blunt end of the solid peg-shaped fastening element through associated entry openings in the connecting element and through the conveyor belt; and
a second ram affixed to said first tool, and having a pointed free end that faces the blunt end of the solid peg-shaped fastening element, and deforms the blunt end of the solid peg-shaped fastening element after the same is pushed through the connecting element.

24. A machine as set forth in claim 23, wherein:
the other end of the solid peg-shaped fastening element is also blunt; and
said first ram contains a pointed free end which deforms the other blunt end of the solid peg-shaped fastening element.

* * * * *

UNITED STATES PATENT AND TRADEMARK OFFICE
CERTIFICATE OF CORRECTION

PATENT NO. : 6,081,995
DATED : July 4, 2000
INVENTOR(S) : Wolfgang Herold

It is certified that error appears in the above-identified patent and that said Letters Patent is hereby corrected as shown below:

Column 1,
Line 23; "connection" should be --connecting--.

Column 9,
Line 4; "claim 9" should be --claim 11--.

Signed and Sealed this

Seventh Day of August, 2001

Attest:

NICHOLAS P. GODICI
Attesting Officer  Acting Director of the United States Patent and Trademark Office